United States Patent [19]

Cassedy, Jr. et al.

[11] 3,725,815
[45] Apr. 3, 1973

[54] PHOTOELASTIC MODE-LOCKING OF Q-SWITCHED LASERS USING BIREFRINGENT CRYSTALS

[76] Inventors: Edward S. Cassedy, Jr., 6 Hampshire Road, Great Neck, N.Y. 11023; Martin Piltch, Postfach 968, D-3400 Gottingen, Germany

[22] Filed: Jan. 10, 1972

[21] Appl. No.: 216,514

[52] U.S. Cl. ............................... 331/94.5, 350/160 R
[51] Int. Cl. ................................................. H01s 3/10
[58] Field of Search .............. 331/94.5; 350/160, 161

[56] References Cited

UNITED STATES PATENTS 3,315,177  4/1967  Benson .............................. 331/94.5
3,541,471  11/1970  Kaminow et al ..................... 331/94.5
3,611,231  10/1971  Burke ................................ 331/94.5

*Primary Examiner*—William L. Sikes
*Attorney*—Harry A. Herbert, Jr. et al.

[57] ABSTRACT

Apparatus for, and a method of, achieving mode-locked operation in a Q-switched laser by using a transparent, photoelastic, uniaxial birefringent crystal. Mode-locked operation is achieved by interposing the crystal within the laser resonant cavity which is of a predetermined length for use with the particular crystal. The crystal is positioned on the longitudinal axis of the laser, and between the laser medium and the Q-switch, with the optic axis of the crystal being in a plane normal to the longitudinal axis of the laser.

6 Claims, 1 Drawing Figure

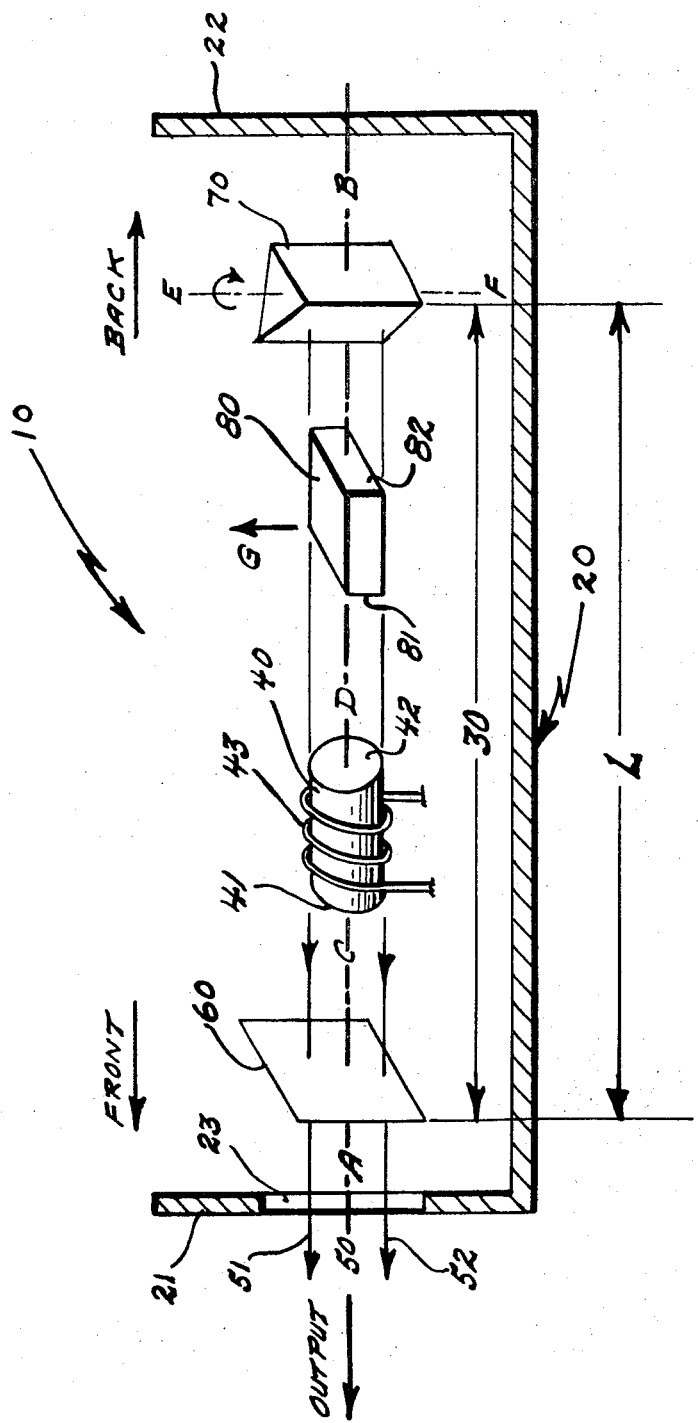

PHOTOELASTIC MODE-LOCKING OF Q-SWITCHED LASERS USING BIREFRINGENT CRYSTALS

BACKGROUND OF THE INVENTION

This invention related to Q-switched lasers and, more particularly, to a novel method and apparatus for achieving mode-locked operation of a laser of that type.

Mode-locking of Q-switched lasers has been achieved in the past. These prior art mode-locking methods and apparatus have consisted, essentially, of and by external modulation or by saturable-absorption means. The prior art methods and apparatus wherein external modulation (e.g. Brillouin scattering, Kerr cells or Pockels cells) is used suffer from two disadvantages. Firstly, and obviously, they require an external source of modulation. Our invention, by contrast, requires no such source. Secondly, synchronization of the modulation source to the intra-cavity resonance is difficult to maintain throughout the entire Q-switched pulse period. Our invention has no such limitation due to the nature of the generation of the mode-locking signal which is a stimulation process internal to the cavity. The prior art methods and apparatus wherein saturable-absorption means (e.g. dye cells or internal effects in gas lasers) are used are subject to self-damage, decomposition or deactivation, thus limiting the useful life-time of the means used. Our invention uses durable crystals with properties similar to the crystals or glasses used in the laser itself.

Therefore, our invention obviates the disadvantages and difficulties of the prior art methods and apparatus and thereby significantly advances the state-of-the-art.

SUMMARY OF THE INVENTION

This invention pertains to a method of and apparatus for achieving mode-locked operation in a Q-switched laser by using a transparent, photoelastic, uniaxial birefringent crystal.

Therefore, an object of this invention is to provide novel apparatus for achieving such mode-locked operation.

Obviously, another object of this invention is to provide a novel method of achieving such mode-locked operation.

These objects, and other equally important and related objects, of this invention will become readily apparent after a consideration of the description of our invention and reference to the drawing.

DESCRIPTION OF THE DRAWING

The drawing is a side elevation view, partially in cross-section, partially in perspective, and in simplified schematic form of a preferred embodiment of our invention, and concurrently also shows the result of the performance of the steps of our inventive method. In the interest of clarity, the directional designations "Front" and "Back" are labelled as such in the drawing and are in the direction shown by the arrows.

DESCRIPTION OF THE PREFERRED EMBODIMENT

With reference to the drawing, therein is shown, in simplified schematic form, a preferred embodiment of our invention and the principal components thereof.

The preferred embodiment of our invention is a laser 10 of the Q-switched type. Laser 10 has a housing 20 with two ends, front end 21 and back end 22. In front end 21 is laser beam output aperture 23. In that connection, the direction of the laser beam output (i.e. the emitted laser beam) is as shown by the arrow designed "output" (i.e. to the reader's left). Laser 10 has a longitudinal or horizontal axis labelled A-B and a cavity 30 (i.e. a resonant cavity), the length of which is designated L.

Within laser housing 20 and laser cavity 30 is active laser medium of the solid type 40, with front end 41 and back end 42, and with longitudinal or horizontal axis C-D which is coincident with laser longitudinal axis A-B. Laser medium 40 is preferably a ruby laser rod and is pumped and excited by conventional means 43, such as a helical xenon flash tube. Not shown, in the interest of maintaining simplicity of the drawing, is associated electrical circuitry for firing the pumping and exciting means 43. The beam emitted by laser medium 40 is designated by reference numeral 50 and the physical width thereof is limited and defined by representative rays 51 and 52.

A partially reflecting output mirror 60 (i.e. partially transparent mirror) is disposed within laser housing 20 near the front end 41 of laser rod 40; is positioned perpendicularly to the longitudinal axis C-D of laser rod 40 and to laser longitudinal axis A-B; and defines one end of laser resonant cavity 30.

A Q-switch 70, preferably of the rotatable prism type, is disposed within laser housing 20 near the back end 42 of laser rod 40; has vertical axis E-F; is positioned perpendicularly to the longitudinal axis C-D of laser rod 40 and to laser longitudinal axis A-B; and defines the other end of laser resonant cavity 30.

A suitable transparent, photoelastic, uniaxial birefringent crystal 80, such as x-cut quartz, is disposed within laser housing 20, and within laser resonant cavity 30, between Q-switch 70 and back end 42 of laser rod 40. The crystal 80 has an optic axis designated G; and, is positioned on the longitudinal axis A-B of laser 10 (and on longitudinal axis C-D of laser rod 40) and its optic axis G in a plane normal to the longitudinal axis A-B of laser 10 (and on longitudinal axis C-D of laser rod 40). Crystal 80 is of optical quality and is cut and polished to optical tolerance (i.e. ends 81 and 82 at 90° ± 2'' and ground to $\lambda/10$ flatness) to minimize losses. A quarter-wave anti-reflecting film is recommended, but is not absolutely necessary, for end faces 81 and 82 of crystal 80. The length of the crystal 80 is not critical, within a range of practical sizes 0.5–5.0 cm. However, the cross-section (i.e. ends 81 and 82) of crystal 80 should be large enough to accommodate the entire physical width 51–52 of laser beam 50.

MANNER OF OPERATION OF THE PREFERRED EMBODIMENT

Our embodiment 10, without crystal 80, operates in the manner of a conventional Q-switched laser. In essence, after pumping and excitation by means 43, laser rod 40 will lase, and an output laser beam, such as 50, will be emitted only when Q-switch 70 is in the reflective or "on" position. The wavelength of the output laser beam, such as 50, is known or can be ascertained.

Our inventive mode-locked operation is achieved by including as a cooperative element a suitable transparent, photoelastic, uniaxial birefringent crystal, such as 80, within resonant cavity 30 and disposing and positioning the crystal as described hereinabove and as shown in the drawing.

Mode-locked operation will occur with the use of a particular transparent, photoelastic, uniaxial birefringent crystal, such as 80, only when the length L of resonant cavity 30 of laser 10 is adjusted or set to satisfy the equation:

$$L = \lambda/(2|N_e - N_o|) \cdot C/V_s$$

where
- $\lambda$ = wavelength of output beam emitted by the laser medium
- $C$ = velocity of light
- $N_o$ = index of refraction of the crystal — ordinary ray
- $N_e$ = index of refraction of the crystal — extraordinary ray
- $V_s$ = velocity of sound in the crystal The velocity of sound enters the relation since the mode-locking operation is dependent on a stimulated photo-elastic parametric interaction. Existence of the interaction is dependent, in turn, on non-zero photoelastic constants appropriate for coupling light, linearly polarized in each of two possible orthogonal directions, to elastic waves for the crystal chosen. The value of L chosen is that appropriate to the velocity of sound ($V_s$) for either shear, longitudinal, or hybrid elastic waves, depending on which is to be used in the interaction. In the case where zero-value photoelastic constants eliminate two of the possible three elastic modes, then the choice of value of $V_s$ is obvious. In cases where photoelastic coupling to two or three elastic modes is possible, then the threshold of the stimulated interaction may determine which value of $L$ (corresponding to one of the values of $V_s$) is optimum.

A tabulation of resonant cavity lengths, together with relevant constants, for some common suitable crystals is as follows, as computed with the use of the above equation:

| crystal | $N_e - N_o$ | V *cm/sec | ** L | photoelastic constant |
|---|---|---|---|---|
| quartz (x-cut) | +0.0090 | 5.75 × 10⁵ | 2.0 m | 0.14 |
| calcite | −0.170 | 7.1 × 10⁵ | 8.6 cm | 0.095 |
| KDP*** | +0.044 | 5.6 × 1⁵ | 42 cm | 0.11 |

\* Compressional perpendicular to the optic axis
\*\* for a ruby laser
\*\*\* potassium dihydrogen phosphate The orientation of the suitable crystal with regard to the axis and the direction of light polarization of the laser is of critical importance. Mode-locking is achieved through the birefringence of the crystal and hence the crystal must be oriented appropriately to achieve this. For uniaxial crystals, the optic axis, such as G, of the crystal must lie in a plane normal to the laser axis, such as A–B, to obtain maximum birefringence $|N_e - N_o|$ for the laser light in the resonant cavity, such as 30. Maximum birefringence is necessary to order to minimize the required laser resonant cavity length L, as can be deduced from the formula given above.

DESCRIPTION OF THE INVENTIVE METHOD

With regard to our inventive method of achieving mode-locked operation in a Q-switched laser by using a transparent, photoelastic, uniaxial birefringent crystal, the method comprises essentially three steps which, in part, have already been inferentially set out above.

The first step comprises selecting a suitable transparent, photoelastic, uniaxial birefringent crystal, such as x-cut quartz crystal 80, for use in and with the Q-switched laser, such as 10, and within the resonant cavity 30.

The second step comprises adjusting the length L of the resonant cavity 30 of Q-switched laser 10 to the length which is appropriate for use of the particular selected transparent, photoelastic, uniaxial birefringent crystal in resonant cavity 30. The value of the length L of the resonant cavity 30 is determined, i.e. is computed, for the selected crystal by the use of, and in accordance with, the equation or formula given above. For example, and with reference to the above table, the length L of resonant cavity 30 which is appropriate for use with an x-cut quartz crystal, such as 80, with a Q-switched laser, such as 10, having a ruby laser rod, such as 40, for achieving mode-locked operation is 2 meters. Therefore, the distance along laser longitudinal axis A–B (and coincident laser rod axis C–D) between partially reflecting output mirror 60 and Q-switch 70, which said two components define and limit the length L of resonant cavity 30, would be adjusted to (i.e. set to) 2 meters in this case. Therefore, in essence the second step comprises, in effect, adjusting the resonant cavity to a predetermined length or, stated in other words, adjusting the length of resonant cavity 30 to a predetermined value.

The third step comprises positioning the particular selected crystal, such as 80, within the resonant cavity, such as 30, and between the Q-switch, 70, and the laser rod, such as 40, and on the longitudinal axis, such as A–B, of the laser, such as 10 (and, of course, on the coincident longitudinal axis, such as C–D, of the laser rod, such as 40), with the crystal having its optic axis in a plane normal to the longitudinal axis A–B of the laser.

The new, useful, unobvious and unexpected result achieved (i.e. attained) by our method is the mode-locked operation of the Q-switched laser.

While there have been shown and described the fundamental features of our invention, as applied to a preferred embodiment and as set forth in an inventive method, it is to be understood that various substitutions, omissions and adaptations may be made by those of ordinary skill in the art without departing from the spirit of the invention.

What is claimed is:
1. An apparatus for achieving photoelastic mode-locked operation of a Q-switched laser, wherein said laser has a longitudinal axis, and wherein said laser has a resonant cavity of predetermined length, and wherein said resonant cavity has two ends, comprising:
   a. an active laser medium of the solid type having two ends and a longitudinal axis, with said longitudinal axis being coincident with the longitudinal axis of the Q-switched laser;
   b. means for pumping and exciting said active laser medium of the solid type, causing said active laser medium to emit an output beam having a physical width and a wavelength;

c. a partially reflecting output mirror disposed near one end of said active laser medium of the solid type and positioned perpendicularly to said longitudinal axis of said active laser medium and to said coincident longitudinal axis of said Q-switched laser, and with said output mirror defining one end of the resonant cavity of predetermined length of said Q-switched laser, and with said output mirror permitting the passage of the emitted output laser beam;

d. a Q-switch disposed near the other end of said active laser medium of the solid type and positioned perpendicularly to said longitudinal axis of said active laser medium and to said coincident longitudinal axis of said Q-switched laser, with said Q-switch also positioned at a predetermined length from said output mirror, and with said Q-switch thereby defining the other end of the resonant cavity of predetermined length of said Q-switched laser;

e. a transparent, photoelastic, uniaxial birefringent crystal suitable for use in the resonant cavity of predetermined length of said Q-switched laser, with said crystal having ends large enough to accommodate the entire physical width of the output laser beam emitted by said active laser medium of the solid type, and with said crystal having an optic axis, and with said crystal positioned on the longitudinal axis of said active laser medium of the solid type and on the coincident longitudinal axis of said Q-switched laser, and with said crystal having its optic axis in a plane normal to the coincident longitudinal axes of said active laser medium and of said Q-switched laser; and further with said crystal having the property of permitting the travel of sound therein, and the property of forming an ordinary ray with an index of refraction as to said crystal, and also the property of forming an extraordinary ray with an index of refraction as to said crystal;

f. and, a housing, with two ends, containing said active laser medium of the solid type, said means for pumping and exciting said active laser medium of the solid type, said partially reflecting output mirror, said Q-switch, and said transparent, photoelastic, uniaxial birefringent crystal, with said housing having an output aperture at one end to permit the passage of the emitted output laser beam from said housing;

and further wherein the length of the resonant cavity suitable for use with the selected crystal is predetermined by use of the equation:

$$L = \lambda/(2|N_e - N_o|) \cdot C/V_s$$

where
$L$ = length of the resonant cavity
$\lambda$ = wavelength of the output beam emitted by the laser medium
$C$ = velocity of light
$N_o$ = index of refraction of the selected crystal — ordinary ray
$N_e$ = index of refraction of the selected crystal — extraordinary ray
$V_s$ = velocity of sound in the selected crystal.

2. The apparatus, as set forth in claim 1, wherein said active laser medium of the solid type is a ruby.

3. The apparatus, as set forth in claim 1, wherein said Q-switch is a rotatable prism.

4. The apparatus, as set forth in claim 1, wherein said transparent, photoelastic, uniaxial birefringent crystal is x-cut quartz.

5. The apparatus, as set forth in claim 4, wherein said Q-switch is positioned two meters from said output mirror.

6. A method of achieving photoelastic mode-locked operation of a Q-switched laser, wherein said laser has a longitudinal axis, and wherein said laser includes an active laser medium of the solid type having a longitudinal axis coincident with the longitudinal axis of the laser, and emitting an output beam of known wavelength, a partially reflecting output mirror, a Q-switch, add a resonant cavity defined and limited in length by the distance between the partially reflecting output mirror and the Q-switch, comprising the steps of:

a. selecting a transparent, photoelastic, uniaxial birefringent crystal, with said crystal having an optic axis, and with said crystal having the property of permitting the travel of sound therein, and the property of forming an ordinary ray with an index of refraction as to said crystal, and also the property of forming an extraordinary ray with an index of refraction as to said crystal;

b. adjusting the length of the resonant cavity to a predetermined length suitable for use with the selected crystal, wherein the length of the resonant cavity suitable for use with the selected crystal is predetermined by use of the equation:

$$L = \lambda/(2|N_e - N_o|) \cdot C/V_s$$

where
$L$ = length of the resonant cavity
$\lambda$ = wavelength of the output beam emitted by the laser medium
$C$ = velocity of light
$N_o$ = index of refraction of the selected crystal — ordinary ray
$N_e$ = index of refraction of the selected crystal — extraordinary ray
$V_s$ = velocity of sound in the affected crystal;

c. and, positioning the selected crystal, having an optic axis, within the resonant cavity, and between the Q-switch and the active laser medium of the solid type, and on the coincident longitudinal axes of the laser and of the active laser medium, with said crystal having its optic axis in a plane normal to the longitudinal axes of the laser and of the active laser medium.

* * * * *